United States Patent

[11] 3,569,613

[72] Inventor John M. Kresock
Fort Wayne, Ind.
[21] Appl. No. 731,164
[22] Filed May 22, 1968
[45] Patented Mar. 9, 1971
[73] Assignee RCA Corporation

[54] COLOR SUBCARRIER OSCILLATORS

11 Claims, 1 Drawing Fig.

[52] U.S. Cl. .......... 178/5.4
[51] Int. Cl. .......... H04n 9/46
[50] Field of Search .......... 178/5.4, 69.5 (CB); 331/(Inquired)

[56] References Cited

UNITED STATES PATENTS

| | | | |
|---|---|---|---|
| 3,012,094 | 12/1961 | Smith, Jr. et al. | 178/69.5CB |
| 3,021,492 | 2/1962 | Kaufman | 178/69.5CB |

*Primary Examiner*—Richard Murray
*Attorneys*—Eugene M. Whitacre and Arthur L. Plevy

ABSTRACT: A color subcarrier oscillator for a television receiver uses a transistor and a feedback network which serves to maintain oscillations in the transistor. The network is selected to provide a feedback signal of a magnitude sufficient to cause the transistor to cease conduction for a portion of a cycle at the frequency of oscillation and further serves to substantially eliminate transistor impedance variations from effecting the frequency of oscillation. In this manner the frequency is determined by a resonant circuit comprising a piezoelectric crystal and a variable reactance device. A transistor output stage operated in a class B mode receives both AC and DC bias from the collector electrode of the oscillator transistor. A high-Q tank in the collector of the class B stage converts current variations therein to sinusoidal voltage fluctuations which are monitored by a phase detector together with the color bursts to provide a control voltage used to synchronize the transistor oscillator via the variable reactance device.

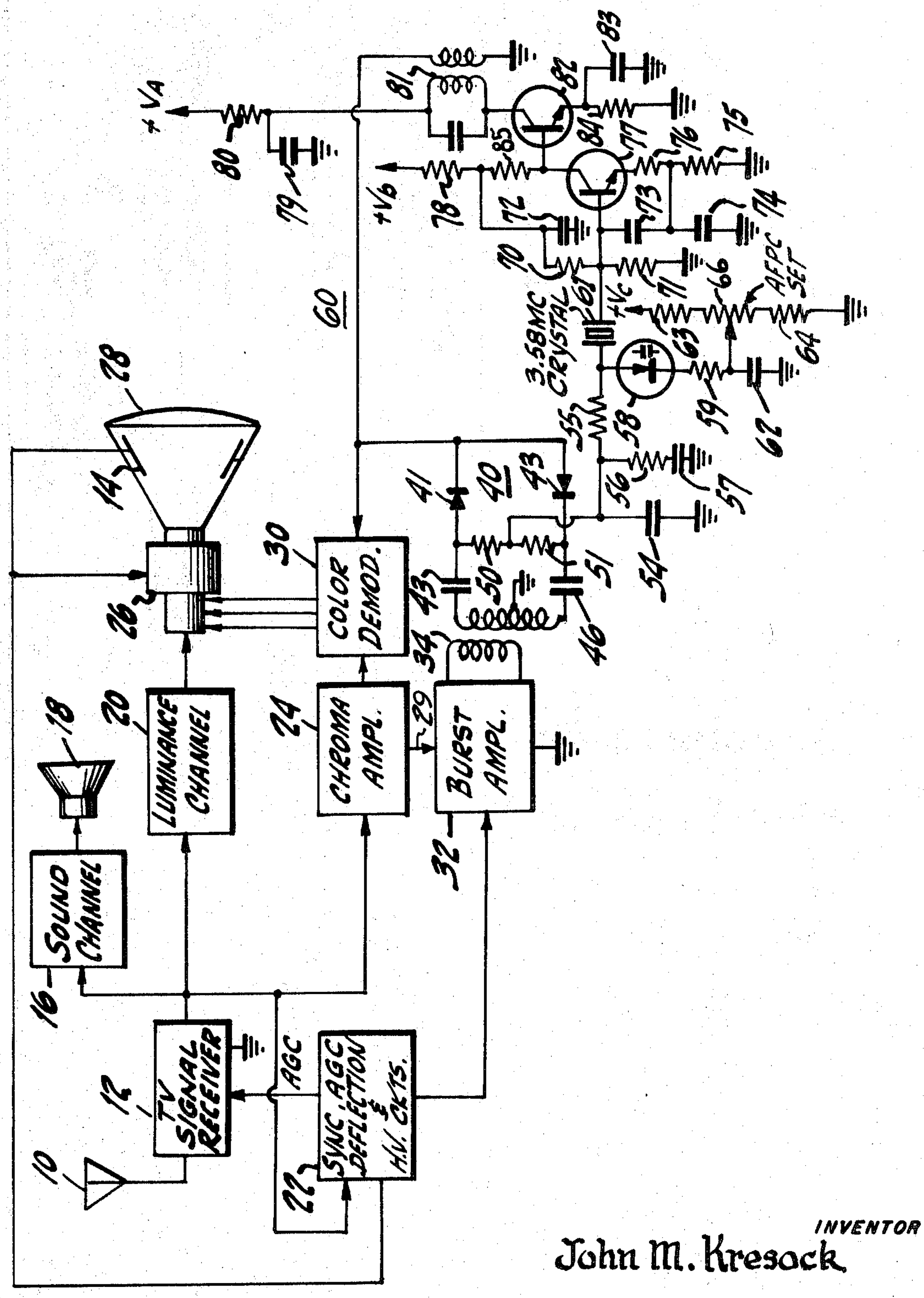
INVENTOR
John M. Kresock
BY Eugene M. Whitacre
ATTORNEY

COLOR SUBCARRIER OSCILLATORS

The present invention relates to an improved color oscillator circuit for use in a color television receiver.

In the present color television signal, both a luminance and a chrominance signal are transmitted. The luminance signal is a wide-band brightness information signal. The chrominance signal is a modulated subcarrier containing modulations representative of various color difference signals Color difference signals of the type R-Y, B-Y and G-Y, namely, red, blue and green difference signals, when individually added to the luminance or Y signal, produce component color signals R, B, and G which are applied to a color image reproducer to produce a transmitted image.

Color difference signals are demodulated from the chrominance signal by synchronous demodulation, that is by heterodyning or sampling the chrominance signal at phases corresponding to the color difference signals desired. In order to make synchronous demodulation possible in a circuit remote from a broadcast transmitter, color synchronizing bursts of reference phase information are transmitted on the "back porch" of each horizontal synchronizing pulse in the color television signal. These color synchronizing bursts are used to synchronize a reference signal source to produce an output signal which has the frequency of the color subcarrier and a phase prescribed by the bursts. The output signal of the reference signal source is split into phases corresponding to the phases of the chrominance signal to be demodulated. These variously phased demodulating signals are then used in a synchronous demodulator to provide demodulation of the desired color difference signals.

For color fidelity in a color television receiver, it is important that the reference signal source be accurately synchronized and maintained at a phase prescribed by the color synchronizing bursts. Such a reference signal source must be capable of maintaining phase synchronization throughout each scanning line following each color synchronizing burst. Also, since some noise may accompany the color synchronizing bursts, noise immunity of the reference signal source while subject to phase synchronization, is highly desirable.

In modern color receivers using transistors the above objectives and difficulties are even more pronounced due to the peculiar characteristics of such devices concerning parameter variations as with voltage temperature and so on.

It is therefore an object of the present invention to provide an improved color oscillator circuit using transistors.

It is a further object to provide an improved transistorized burst synchronized oscillator for use in a color television receiver.

These and other objects of the present invention are accomplished in one embodiment by using a transistor having a feedback network coupled between its base and emitter electrodes. The feedback network is selected to provide sufficient feedback in a direction to sustain oscillations. The magnitude of the feedback signal is also controlled by this network to cause the transistor to cease conduction for a portion of the cycle at the frequency of oscillations. This limits power dissipation and assures stable operating conditions. The feedback network is furthermore selected such that the reactance present at the input or base electrode of the transistor is substantially smaller than the reactance present at said input due to normal transistor operation. A frequency determining network is coupled between the base electrode and ground and comprises a piezoelectric crystal with a variable reactance device for determining the specific operating frequency of the transistor independent of the input impedance.

An output transistor stage has its base electrode coupled to the collector electrode of the oscillator transistor and is biased for class B operation. A high-Q parallel resonant tank coupled to the collector electrode of the output stage serves to convert current variations in this output stage into sinusoidal waveshapes. These waveshapes are applied to an input of a phase detector which also receives the color synchronizing bursts. The phase detector develops an output control voltage which is proportional to phase differences between the sinusoidal waveshape and the color synchronizing bursts. This control signal is applied to the varactor diode to control its reactance and therefore the frequency of oscillations. In this manner complete synchronization is afforded regardless of the input impedance of the oscillator transistor, and minimum dissipation for specified operating characteristics is accomplished.

For a clearer understanding of the present invention reference may be had to the following specification given in connection with the accompanying drawing wherein the FIG. is a schematic circuit diagram partially in block form of a color television receiver embodying an oscillator circuit according to the present invention.

Referring now to the FIG. an antenna 10 is coupled to the input terminals of a television signal receiver 12. The portion of the receiver included in the rectangle 12 includes the tuner, intermediate frequency amplifier, video detector and intercarrier sound detector.

The intercarrier sound detector provides a 4.5 mHz. intercarrier sound wave which is amplified and detected in the sound channel 16. The recovered audio frequency sound signal is amplified and applied to a loudspeaker 18.

The demodulated video signal from the video detector is applied to the sync, AGC, deflection and high voltage circuits 22. The synchronizing pulse components of the video signal are used to control horizontal and vertical deflection generators. Vertical and horizontal deflection signals developed by the deflection generators are applied to the deflection yoke 26; and a high voltage developed from the horizontal retrace pulse is applied to the ultor 14 of the color kinescope 28, which may be a three electron gun shadow mask tube. The deflection and high voltage circuit 22 also produces pulses at the horizontal rate and of a suitable polarity to gate a burst amplifier 32. The gating pulses for the burst amplifier 32 may be provided by an auxiliary winding on the horizontal deflection output transformer, associated with the deflection and high voltage circuit 22.

The composite video signal is applied to a chroma amplifier 24 which is coupled to color demodulators 30. The chrominance sidebands occupies a range of frequencies from 2 to 4.2 mHz.

The chrominance amplifier 24 also applies the chrominance signal to the burst amplifier 32 by means of a conductor 29. The burst amplifier 32 is keyed by a gate pulse from the deflection and high voltage circuit 22 to separate the color synchronizing bursts from the remainder of the received color television signal. The separated bursts are applied to a balanced input of a phase detector 40, which also receives a single-ended input from a 3.58 mHz. color oscillator 60. A control voltage is developed by the phase detector 40 according to differences in phase between the burst signal and the oscillator signal, and used to control the frequency and phase of the resultant oscillator signal.

The burst synchronized oscillator 60 provides a phase locked 3.58 mHz. signal which is applied to the color demodulation channel 30. The oscillator 60 signal is suitably phase shifted to enable proper demodulation of at least two color difference signals contained in the chrominance signal. R-Y, B-Y and G-Y color difference signals obtained from the demodulation channel 30 are applied to corresponding control electrodes of the color kinescope 28.

The demodulated video signal is also applied by way of the luminance channel and delay line 20 to the cathodes of the color kinescope 28.

The operation and configuration of the locked oscillator 60 will now be described in greater detail.

The separated bursts are applied to an input of a phase detector 40 y means of the primary winding of a transformer 34. The secondary winding of transformer 34 is balanced with respect to a reference potential by connecting the center tap thereof to ground. A terminal of the secondary winding is coupled to the anode of a diode 41 through a capacitor 43. The cathode of diode 41 is coupled to the anode of diode 43, whose cathode is coupled to the other terminal of the secondary winding through capacitor 46. Resistors 50 and 51 appear in series between the anode of diode 41 and the cathode of diode 43. The junction between these resistors is used as the output of phase detector 40. The control voltage at the output is used to vary the phase of the signal oscillator 60 by changing the bias on a varactor diode 58 forming part of the tuned circuit of the oscillator.

The oscillator 60 uses a transistor 77 having its collector electrode coupled to a potential source $+V_b$ through a collector load resistor 85 in series with a decoupling resistor 78. The junction between resistor 85 and resistor 78 is bypassed to ground for higher frequency alternating current signals by capacitor 72. The emitter electrode of transistor 77 is returned to a point of reference potential, such as ground, through the series resistors 75 and 76. Feedback necessary to sustain oscillations is obtained by coupling the junction between resistors 75 and 76 to the junction of capacitors 73 and 74, which appear in series between the base electrode of transistor 77 and ground. Operating bias for transistor 77 is obtained by the voltage divider comprising resistors 70 and 71, the junction of which is coupled to the base electrode of transistor 77. A frequency determining network includes a piezoelectric crystal 61 having one terminal coupled to the base electrode of transistor 77 and the other terminal coupled to the output of the phase detector 40 through the isolating resistor 55. The junction between the crystal 61 and resistor 55 is coupled through a path comprising a varactor diode 58, in series with a current limiting resistor 59, to the center arm of a variable potentiometer 66 designated as AFPC set. The other two terminal of potentiometer 66 are coupled respectively to a terminal of a resistor 63 whose opposite terminal is coupled to a positive source $+V_c$, and a terminal of a resistor 64 whose other terminal is grounded. A bypass capacitor 62 shunts the center arm of potentiometer 66 to ground for AC signals. The potentiometer 66 forming part of the voltage divider between $+V_c$ and ground, serves to set the quiescent bias on varactor diode 58 to determine its DC operating point.

The collector electrode of transistor 77 is used as the output of the oscillator stage and is directly coupled to the base electrode of a common emitter stage employing transistor 82. The collector electrode of transistor 82 is coupled through a parallel resonant tank 92 and a series resistor 80 to a positive source of potential $+V_a$. The junction between resistor 80 and the parallel resonant tank 92 is bypassed for 3.58 mHz. to ground via capacitor 79. The inductive component of the parallel resonant tank 92 forms the primary winding of a transformer 81 whose secondary winding is coupled between ground and the single-ended input to phase detector 40, at the junction between the cathode of diode 41 and the anode of diode 43.

The operation of the circuit is as follows. The crystal 61 has a parallel resonant mode selected to provide oscillations at 3.58 mHz. in the illustrated circuit. The crystal appears primarily inductive at the subcarrier frequency and the varactor diode 58 supplies the major portion of the external load capacitance. A parallel resonant circuit is provided between the base electrode of transistor 77 and ground comprising the crystal 61, the capacitance of diode 68, and the capacitors 73 and 74. Due to the selection of the magnitude of capacitors 73 and 74 to be large with respect to that capacitance of varactor diode 68, the parallel resonant circuits capacitive reactance is primarily determined by varactor diode 68. In this manner, since crystal 61 is the only inductive component in the frequency determining network it is primarily accountable for providing stability to oscillator 60. Frequency control is accomplished in the circuit by varying the reverse bias on varactor diode 58. In a known manner changing the reverse bias across the varator's junction serves to change its capacitance and therefor the load capacitance across the crystal 61. The control voltage is applied through resistor 55 to the anode of varactor diode 58. Resistor 55 also serves to provide isolation between the diode 58 and the source of the control voltage which is phase detector 40. This resistor 55 together with capacitor 54 form an RC filter which isolates the 3.58 mHz. signal from affecting the operation of the detector 40. The AFPC potentiometer 55 is used to adjust the quiescent capacity of the varactor 58 and is set to provide a zero beat oscillator frequency with a nominal 3.58 mHz. subcarrier frequency. The AFPC set potentiometer 66 is bypassed for 3.58 mHz. signal by capacitor 62.

Resistor 59 coupled between the variable arm of potentiometer 66 and the cathode of varactor diode 58 functions to aid in setting the strength of oscillations in the circuit. The value of this resistor 59 determines the degree to which the voltage output of the oscillator supplies a safe operating potential across the varactor diode 58. This is essential due to the fact that only a certain range of peak-to-peak or AC voltage swing can be tolerated across varactor 58 while still maintaining proper circuit performance. The cycles per second per volt sensitivity of the oscillator circuit 60 will be degraded if large peak-to-peak voltage swings are developed across varactor diode 58. Besides this, in order to tolerate large voltage swings a varactor with a higher reverse peak voltage rating is necessary which therefore results in a more expensive component. The cycles per second per volt sensitivity of the oscillator 60 is affected because the average capacitance presented by the varactor 58 is a function of both the DC bias imposed on the device plus the alternating current variations superimposed on the DC.

The control voltage supplied by phase detector 40, which is shown in a balanced configuration, with reference to ground, is a function of the phase difference between the incoming burst signals and the output signal of the oscillator 60 coupled thereto via the secondary winding of transformer 81. A correction voltage is obtained as the oscillator 60 is operating at a different frequency from that of the incoming bursts. Base bias for transistor 77 is supplied from the $+V_b$ supply through resistors 70 and 71. Emitter resistor 75 is selected to provide stability in DC operation and is selected compatible with the magnitude of resistors 70 and 71. Emitter resistor 76 serves in conjunction with resistor 59 to determine the overall strength of oscillation in the system. Resistor 76 functions as an emitter degenerating resistor for transistor 77 and in providing negative feedback controls the amount of oscillator power which is positively fed back to the frequency determining network described above. Therefore the positive feedback signal determined by the magnitude of resistor 76 and resistor 75, in combination with the current limiting provided by resistor 59 serves to maintain the power dissipation within the crystal and the transistor 77 relatively constant. This in turn assures a stable amplitude of oscillation with moderate variations in the Q of the crystal 61, the varactor 58 and associated components. Parameter variations as affecting the frequency of the oscillator are minimized by using relatively large capacitors 73 and 74. In this manner the input impedance looking into the oscillator transistor 77 is relatively large capacitance which appears in series with the capacitance of varactor diode 58. In this manner varactor diode 58 primarily controls the frequency and large change in frequency per volt change in control voltage or varactor bias is achieved.

The positive feedback assures oscillation in that the magnitude of this signal is sufficient to make up for the Q losses suffered in the frequency determining network. The signal feedback is determined in part by the relative magnitude of capacitors 73 and 74 which give enough overall feedback gain to allow reverse biasing of the base-to-emitter junction of transistor 77 during the negative portion of the base waveform.

The oscillator transistor 77 does not conduct for the negative cycle of the waveform present at the base electrode and the collector electrode waveshape is a negative-going half-sine wave corresponding to the actual conduction time of the oscillator transistor 77. This waveshape is used to drive the output stage using transistor 82.

The output stage operates in a class B mode. The base electrode of transistor 82 receives both DC bias and AC drive from the collector electrode of transistor 77. The collector electrode of transistor 82 is biased from the $+V_a$ source through the parallel tank circuit and the decoupling resistor 80 bypassed by capacitor 79. The emitter electrode of transistor 82 is returned to ground through resistor 84 which is bypassed by capacitor 83.

Since the base voltage of transistor 82 is determined by the DC operating voltage of transistor 77, emitter resistor 84 is made relatively large to maintain the transistor biased for class B operation.

As the collector waveform for transistor 77 begins to go negative the output transistor 82 cuts off due to the fact that the emitter voltage cannot follow because of the relatively long time constant associated therewith. The emitter bypass capacitor 83 tends to discharge through resistor 84 causing the collector to go more positive when the base voltage goes to its maximum positive value as at the beginning of the cycle the emitter capacitor charges back up to the initial voltage. The collector current waveshape of transistor 82 is approximately a half-sine wave, which due to the action of the high-Q parallel tank is converted thereby to a sinusoidal voltage having a frequency of 3.58 mHz. which is coupled through the secondary winding of transformer 81 for use by the phase detector 40 and the demodulator circuits 50.

A burst synchronized color oscillator circuit operating in accordance with this invention used the following components.

| | |
|---|---|
| Resistors 50, 51 | 1,000,000 ohms |
| Resistor 55 | 100,000 ohms |
| Resistor 56 | 33,000 ohms |
| Resistor 59 | 1,000 ohms |
| Resistor 63 | 3,900 ohms |
| Resistor 64 | 390 ohms |
| Resistor 66 | 2,000 ohms (variable) |
| Resistor 70, 71 | 18,000 ohms |
| Resistor 75 | 4,700 ohms |
| Resistor 76 | 18 ohms |
| Resistor 78 | 100 ohms |
| Resistor 80 | 8,200 ohms |
| Resistor 84 | 5,600 ohms |
| Capacitors 43, 46 | 330 micromicrofarads |
| Capacitor 54 | 0.01 microfarads |
| Capacitor 57 | 0.1 microfarads |
| Capacitor 62 | 0.01 microfarads |
| Capacitor 72 | 0.01 microfarads |
| Capacitor 73 | 470 micromicrofarads |
| Capacitor 74 | 100 micromicrofarads |
| Capacitor 79 | 0.01 microfarads |
| Capacitor 83 | 0.01 microfarads |
| Varactor 58 | 20 $\mu\mu f$ at −4 volts |
| Transistor 77 | SE1001 |
| Transistor 82 | SE7010 |
| Crystal 61 | 3,579,545 Hz. |
| $+V_a$ | +150 v. |
| $+V_b$ | +30 v. |
| $+V_c$ | +15 v. |

I claim:

1. A color subcarrier reference oscillator, comprising:

a. a transistor having a base, emitter and collector electrode;

b. a feedback circuit coupled between the emitter and base electrodes of said transistor for providing a feedback signal of a sufficient magnitude to cause said transistor to sustain self-oscillations, said feedback signal further causing said first transistor to cease conduction for a portion of the cycle of said self-oscillatory frequency;

c. a piezoelectric crystal;

d. a variable reactance device; and e. means coupling said crystal in a series path with said variable reactance device between said base electrode of said transistor and a point of reference potential, said crystal providing an inductive reactance and said variable reactance device providing a capacitive reactance for determining the frequency of said self-oscillations substantially independent of the input impedance of said transistor.

2. A color subcarrier reference oscillator, comprising:

a. a transistor having a base, collector and emitter electrode;

b. means coupled to said electrodes adapted to receive operating bias;

c. a resistor coupled between said emitter electrode and a point of reference potential;

d. a capacitance coupled between said base electrode and a point of reference potential, said capacitance having a magnitude selected to present a small capacitive reactance at said color subcarrier frequency when compared with that reactance due to the input impedance of said transistor at said base electrode, e. means for coupling an intermediate point of said resistor to an intermediate point of said capacitance to provide feedback to said transistor via said base electrode in a direction to sustain self-oscillation;

f. a resonant circuit coupled between said base electrode and a point of reference potential said circuit including a crystal operated in a parallel resonant mode for providing mainly an inductive reactance and a variable reactance device in series therewith for providing mainly a capacitive reactance, said crystal and said variable reactance device determining said frequency of said self-oscillations to correspond substantially to that frequency of said color subcarrier relatively independent of the input impedance of said transistor.

3. In a color television receiver including a source of periodically recurring color synchronizing bursts of a given frequency and phase, burst synchronized apparatus comprising in combination:

a. first and second transistors each having a base, collector and emitter electrode;

b. a feedback network coupled between the emitter and base electrode of said first transistor for providing a feedback signal of a sufficient magnitude to cause said first transistor to sustain self-oscillations, said feedback signal further causing said first transistor to cease conduction for a portion of the cycle of said self-oscillatory frequency;

c. a piezoelectric crystal;

d. a variable reactance device;

e. means coupling said crystal in a series circuit path with said variable reactance device between said base electrode of said first transistor and a point of reference potential for determining the frequency of said self-oscillations, said crystal providing an inductive reactance and said variable reactance device providing a capacitive reactance;

f. means coupling the collector electrode of said first transistor to the base electrode of said second transistor;

g. means for biasing said second transistor to operate in a class B mode;

h. a parallel resonant tank circuit coupled between the collector of said second transistor and a source of potential, for converting current variations of said second transistor due to said class B mode into substantially sinusoidal signals;

i. detector means responsive to said sinusoidal signals and said color bursts to provide a control voltage representative of phase differences therebetween; and j. means coupled between said detector means and said variable reactance device for applying said control voltage to said variable reactance device to alter said phase and frequency of said self-oscillations to correspond to that phase and frequency of said synchronizing bursts.

4. The burst synchronized apparatus according to claim 3 wherein said variable reactance device is a varactor diode.

5. The burst synchronized apparatus according to claim 4 wherein said means coupling said crystal in a circuit path with said varactor diode includes a resistor in series with said varactor diode of a magnitude selected to limit the voltage across said diode to always maintain said diode in a reverse-biased mode.

6. The burst synchronized apparatus according to claim 3 wherein said feedback network includes a capacitive divider comprising first and second capacitors coupled in series between the base electrode of said first transistor and a point of reference potential, means coupling the junction between said first and second capacitors to said emitter electrode of said first transistor, said first and second capacitors selected to have a combined reactance at said color synchronizing burst frequency substantially smaller than the normal reactance present at said base electrode due to normal operation of said first transistor.

7. In a color television receiver including a source of periodically recurring color synchronizing bursts of a given frequency and phase, a burst synchronized oscillator comprising in combination:

a. a transistor having a base, emitter and collector electrode;
b. a network coupled between the emitter and base electrode for providing feedback in a direction to sustain self-oscillations, said network including a capacitive divider having a reactance at said color synchronizing burst frequency substantially smaller than the normal reactance present at said base electrode due to normal transistor operation;
c. a piezoelectric crystal;
d. a variable reactance device;
e. means coupling said piezoelectric crystal in a series path with said variable reactance device between said base electrode and a point of reference potential, for determining the frequency of said self-oscillation, said crystal providing an inductive reactance and said variable reactance device providing a capacitive reactance
f. detector means responsive to said self-oscillations and said color synchronizing bursts to provide a control voltage representative of phase differences therebetween; and
g. means coupled between said detector means and said variable reactance device for applying said control voltage to said variable reactance device to alter said phase and frequency of said self oscillations to correspond to that phase and frequency of said synchronizing bursts, substantially independent of said transistor's input impedance.

8. In a color television receiver including a source of periodically recurring color synchronizing bursts of a given phase and frequency, burst synchronized apparatus, comprising in combination:

a. first and second transistors each having a base, emitter and collector electrode;
b. a capacitive divider including first and second capacitors coupled in series between the base electrode of said first transistor and a point of reference potential, the junction therebetween coupled to the emitter electrode of said first transistor, said first and second capacitors selected to provide feedback for said transistor to sustain oscillations, while further providing suitable feedback signal magnitude to cause said transistor to cease conduction for a portion of a cycle at said frequency of oscillations and to further provide a small capacitive reactance at said base electrode when compared with the reactance thereat due to normal transistor operation;
c. a circuit path coupled between said base electrode of said first transistor and a point of reference potential including a piezoelectric crystal operating to provide an inductive reactance and a varactor diode for providing a capacitive reactance, said diode and crystal determining said frequency of oscillation substantially independent of said first transistor input impedance;
d. a direct coupling path between the collector electrode of said first transistor and the base electrode of said second transistor;
e. means coupling the emitter electrode of said second transistor to a point of reference potential to provide with said direct coupling path a bias serving to operate said second transistor in a class B mode;
f. a parallel resonant circuit coupled between collector of said second transistor and a point of potential to convert current variations in said second transistor due to said class B mode to substantially sinusoidal waveshapes;
g. detector means responsive to said sinusoidal waveshapes and said color synchronizing bursts for providing a control voltage proportional to phase and frequency differences therebetween; and
h. means coupling said detector means to said varactor diode for applying said control voltage thereto to alter said frequency and phase of said first transistor oscillations in accordance with said phase and frequency differences.

9. In a color television receiver, a source of reference oscillations of substantially sinusoidal waveshape for use in the synchronous demodulation of a modulated subcarrier component of a received color television signal, comprising:

a. a first transistor having base, collector and emitter electrodes;
b. a first resonant circuit coupled between said base electrode of said first transistor and a point of reference potential, and selected to resonate at a specified frequency substantially equal to the nominal frequency of said subcarrier;
c. a feedback circuit coupled between said emitter and base electrodes of said first transistor for providing a feedback signal of a sufficient magnitude to cause said first transistor to sustain oscillations at said specified frequency, said feedback signal further causing said transistor to cease conduction for a portion of each oscillation cycle, whereby the collector current of said first transistor is subject to nonsinusoidal variations at said specified frequency;
d. output circuit means coupled to said collector electrode of said first transistor for developing voltage variations at said specified frequency of nonsinusoidal waveshape in response to said collector current variations;
e. a second transistor having an input electrode and an output electrode
f. means, including a coupling between the collector electrode of said first transistor and the input electrode of said second transistor, for rendering said second transistor conducting during the portion of each oscillation cycle when said first transistor ceases conduction and for interrupting the conduction of said second transistor for at least a segment of the remaining portion of each oscillation cycle; and
g. means, including a second resonant circuit tuned to a frequency substantially equal to said specified frequency and coupled to said output electrode of said second transistor, for developing said reference oscillations of substantially sinusoidal waveshape in response to the periodic interruptions of conduction of said second transistor.

10. Apparatus in accordance with claim 9 wherein said receiver includes means for synchronizing said oscillator with a burst component of said received color television signal, said synchronizing means developing a correction voltage in response to departures from synchronization:

wherein said first resonant circuit includes a piezoelectrical crystal and a varactor diode for determining the tuning thereof; and
wherein means are provided for causing the reactance exhibited by said diode in said first resonant circuit to vary in accordance with said correction voltage.

11. In a color television receiver, a source of reference oscillations of substantially sinusoidal waveshape for use in the synchronous demodulation of a modulated subcarrier component of a received color television signal, comprising:

a. a first transistor having an input electrode and a pair of output electrodes;

b. frequency selective feedback circuit means for providing a positive feedback signal between one of said output electrodes and said input electrode of a sufficient magnitude at a specified frequency substantially equal to the nominal frequency of said subcarrier to cause said first transistor to sustain oscillations at said specified frequency, said feedback signal further causing said transistor to cease conduction for a portion of each oscillation cycle, whereby the output current of said first transistor is subject to nonsinusoidal variations at said specified frequency;

c. output circuit means coupled to one of said output electrodes of said first transistor for developing voltage variations at said specified frequency of nonsinusoidal waveshape in response to said output current variations;

d. a second transistor having an input electrode and an output electrode;

e. means, including a coupling between said output circuit means and electrode; input electrode of said second transistor, for rendering said second transistor conducting during the portion of each oscillation cycle when said first transistor ceases conduction and for interrupting the conduction of said second transistor for at least a segment of the remaining portion of each oscillation cycle; and f. means, including a second resonant circuit tuned to a frequency substantially equal to said specified frequency and coupled to said output electrode of said second transistor, for developing said reference oscillations of substantially sinusoidal waveshape in response to the periodic interruptions of conduction of said second transistor.